Nov. 8, 1955                A. G. CLAVIER ET AL                2,723,378
                            TRANSMISSION LINE SYSTEM
Filed March 27, 1950                                      3 Sheets-Sheet 3
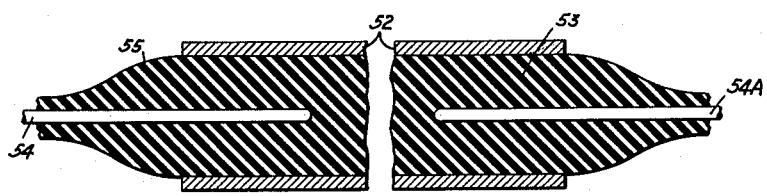
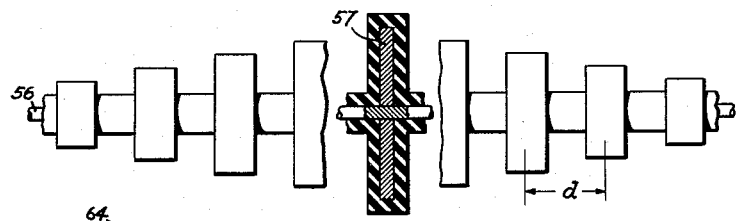
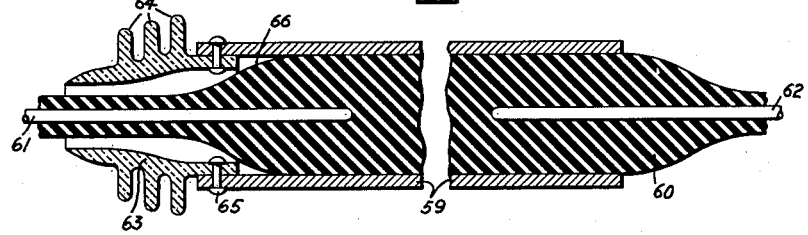
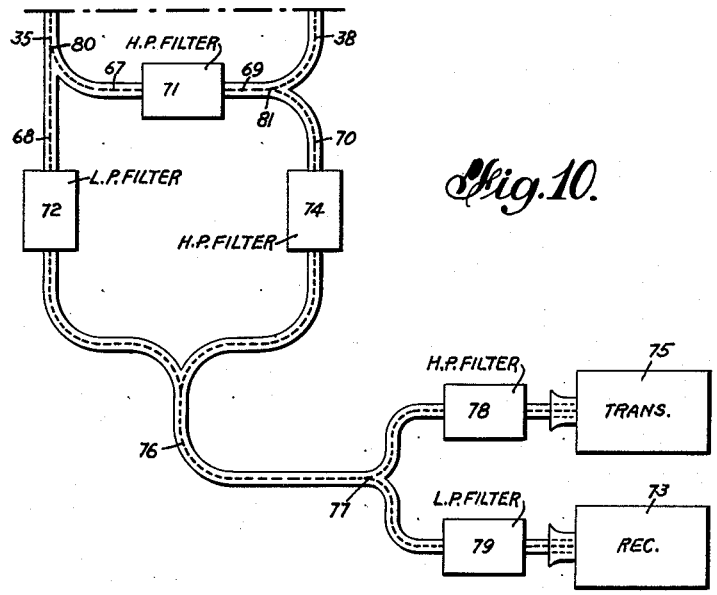
INVENTORS
ANDRE G. CLAVIER
DAVID L. THOMAS

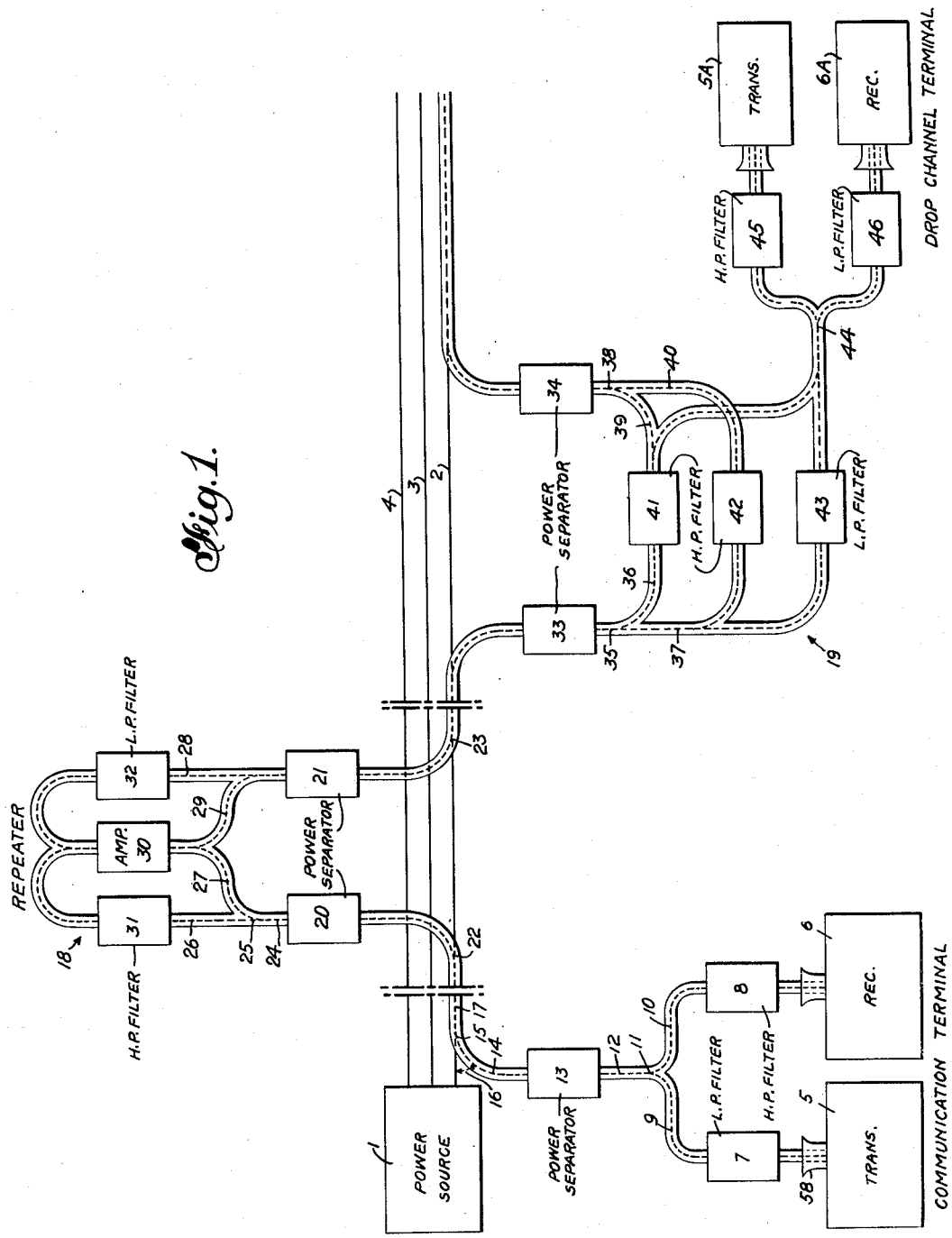

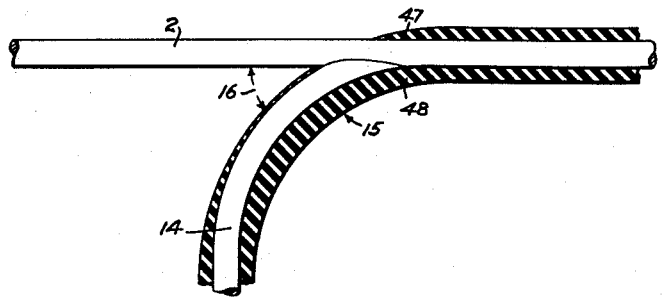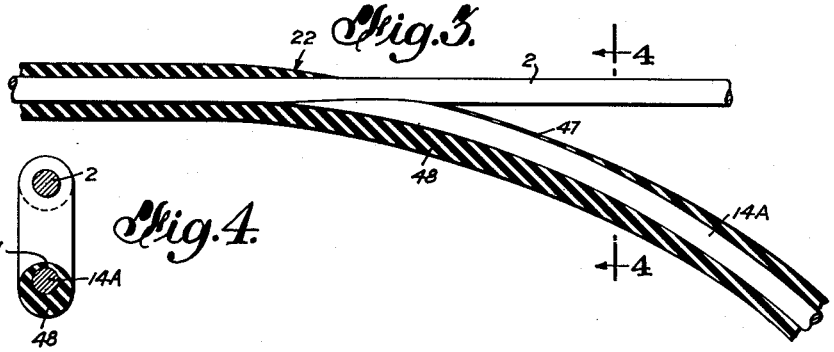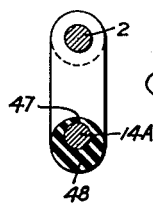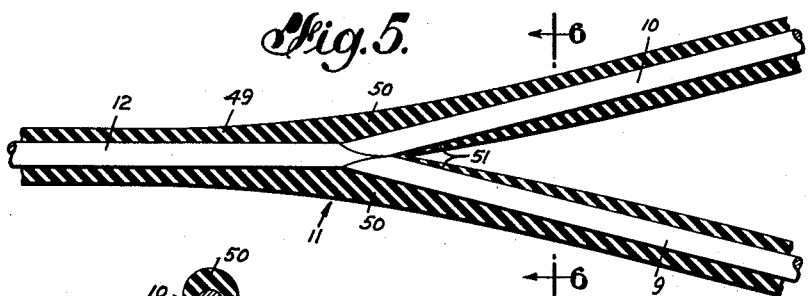

United States Patent Office 2,723,378
Patented Nov. 8, 1955

2,723,378

TRANSMISSION LINE SYSTEM

Andre G. Clavier, Nutley, N. J., and David L. Thomas, Lee, London, England, assignors to International Standard Electric Corporation, New York, N. Y., a corporation of Delaware Application March 27, 1950, Serial No. 152,131

7 Claims. (Cl. 333—9)

This invention relates to microwave transmission systems and more particularly to a combined power and microwave transmission system.

In addition to the transmission of microwave energy over radio links, coaxial cables and dielectric waveguides, it has recently been discovered that high frequency energy covering a very wide band may be transmitted by means of a single wire properly insulated, the transmission of energy being confined closely adjacent the surface of the wire in the electric and magnetic fields formed thereabout. It has long been recognized that when a single wire had electric energy applied thereto that electric and magnetic fields are formed about the wire but it was believed that these fields extended outwardly without any definite limits or boundary. It has been found, however, that if the conductor is coated with a given thickness of insulation the electromagnetic fields are concentrated and substantially confined within a cylindrical volume of a given radius about the conductor, the given radius being determined by the size of the conductor and the quality and thickness of the insulating coating. By way of example, an ordinary No. 12 enameled copper wire was found to have an electromagnetic field concentrated within a three to four inch radius about the wire and that the high frequency energy flowed in this field. This manner of propagation now referred to as "surface wave transmission" presents very small loss and is substantially free from electrical and other disturbances where this confined cylindrical field is substantially unobstructed. An explanation of surface wave transmission phenomena may be found in the May 1950 issue of the publication entitled "Radio and Television News," on page 10.

One of the objects of this invention is to provide means for transmission over a power line of microwave energy according to the aforesaid surface wave propagation.

Another object of the invention is to provide a transmission line for simultaneous transmission of power and microwave energy; to provide for the division of the transmission line with a corresponding division of the power line and/or microwave energies as may be desired; and to provide filters for filtering power energy or certain low frequency energies and passing the microwave energies only.

Still other objects of the invention are to provide a repeater-amplifier for the microwave energies transmitted over either a power line or a microwave transmission line; and to provide drop channel circuits for such lines.

One of the features of the invention is the provision of a power filter which prevents the transmission of electric power therethrough but permits the transmission of microwave energy. This filter may also be proportioned to permit passage of a given frequency band of microwave energy and exclude others. As a further feature of the invention, transmission line dividers referred to as directional dividers are provided whereby electric power and/or microwave energy may be divided or separated. By way of example, a transmission line carrying both electric power and microwave enregy may be divided with respect to both types of electric energies or the division may be between the two types of energies, or the division may be with respect to microwave enregy only, the device having directional properties.

Still another feature is the arrangement of high and low pass filters and the division of the single conductor as to provide for the amplification of microwave energy transmitted over the single conductor and also to provide for drop channel communication at selected points along a transmission line.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 shows a schematic diagram of a combined power and microwave transmission system which includes for purposes of illustration a combined power and microwave transmission line, a microwave repeater-amplifier and a drop channel circuit;

Figs. 2 and 3 show in longitudinal section two forms of energy divider lines for the introduction and removal respectively of microwave energy with respect to a power line, Fig. 3 being taken along line 3—3 of Fig. 4;

Fig. 4 is a sectional view taken along line 4—4 of Fig. 3;

Fig. 5 shows still another form of transmission line divider for the directional division of microwave energy;

Fig. 6 is a sectional view taken along line 6—6 of Fig. 5;

Fig. 7 shows in longitudinal section a high pass filter for separating electric power or low frequency energy from microwave energy;

Fig. 8 shows in longitudinal section a low pass filter;

Fig. 9 shows in longitudinal section a power-microwave separating filter; and

Fig. 10 shows a schematic diagram of an alternative drop channel circuit.

Referring to Fig. 1 of the drawings, a combined power and microwave transmission system is illustrated. A power source 1 is shown to have a transmission line comprised of three conductors 2, 3 and 4 for transmission of power, such as three-phase alternating current. It will be understood, however, that the invention is also applicable to other power lines such as single phase alternating current or even high potential direct current. It should also be understood that while different directions of signalling over a single conductor is characterized by a frequency difference, different directions of signalling may be effected over separate conductors in which case directional filters hereinafter described may be omitted.

Associated with one of the conductors of the power line is a microwave transmission system which requires a single insulated conductor for transmission purposes. One terminal of the microwave transmission system is shown to comprise a transmitter 5, a receiver 6, a low pass filter 7 for the transmitter connection and a high pass filter 8 for the receiver connection, 7 and 8 being essentially directional filters. Connected to the filters 7 and 8 are two legs 9 and 10 of a microwave transmission line which are joined at a junction 11 into a single conductor line 12. The conductor 12 is connected to the power line conductor 2 through a band pass filter and power separator 13 and transmission line 14. The conductor 14 is joined by a junction 15 to the conductor 2 at an acute angle 16 so that high frequency energy conducted along the line 14 is propagated along the power line in the desired direction, that is, in the direction of the apex of the acute angle 16. The conductor 2 is likewise insulated from the point of junction 15 as indicated by insulation 17 for the distance over which the microwave energy is to be transmitted along the power line.

The microwave transmission along the power line 2 may continue to a point where the microwave signal energy is to be removed from the power line. If the distance is great one or more repeaters may be required for amplification of the microwave energy. It may also be desirable to drop a signal channel from the microwave energy at certain points along the line. The system shown in Fig. 1 indicates a form of repeater 18 that may be associated with the power line for amplifying the microwave energy and also a drop channel circuit 19. Fig. 1 does not show the final terminal for the microwave signal energy but it will be understood that a terminal similar to the transmitter-receiver ararngement 5, 6 may be provided at the far end of the transmission line.

The repeater 18 comprises two high pass, power separating filters 20 and 21 which are coupled to the power conductor 2 by junctions 22 and 23. The conductor 2 between the two junctions 22 and 23 is left bare of insulation so that the microwave energy will follow the transmission lines connected to the filters 20 and 21. It will also be noted that the directions of conductor coupling at the junctions are such that the proper direction will be given to the microwave propagation with minimum loss of energy due to bare wire radiation.

Referring more particularly to the repeater circuit 18 the transmission conductor 24 at the repeater side of filter 20 is divided as indicated at 25 into two branches 26 and 27. The conductor on the repeater side of filter 21 is likewise divided into branches 28 and 29. The conductors 27 and 29 are joined and connected to a microwave amplifier 30, which is preferably of the traveling wave type, although other high frequency amplifiers may be used. The other branches 26 and 28 are connected to the output of the amplifier through a low pass filter 31 and a high pass filter 32, respectively. By this form of single wire repeater the microwave energies of both the low and high frequency bands are amplified by the same amplifier unit. The direction of propagation of the two frequency bands, however, is controlled by the high pass and low pass filters 31, and 32, respectively. However, for systems in which a conductor is used for each direction of transmission, and each direction of transmission occupies the same frequency band, the repeater would then have a separate amplifier for each direction of transmission.

For the drop channel circuit, two high pass, power separating filters 33 and 34 are connected to the power line conductor 2 so that the microwave energy is removed from the conductor 2 for passage through the drop channel circuit. The conductor 35 associated with the drop channel side of filter 33 is split into branches 36 and 37 while the conductor 38 on the drop channel side of the filter 34 is split into conductors 39 and 40. The branches 36 and 39 are connected to a high pass filter 41 designed to pass the upper frequency band only thus stopping the lower frequency band which includes the low frequencies to be dropped but passing the frequencies to be inserted. Branches 37 and 40 are connected to another high pass filter 42 designed to pass all of the frequencies above those being dropped. Connected to the branch 37 is a low pass filter 43 designed to pass only that part of the lower frequency band required to be dropped. A single drop channel transmission conductor 44 which passes on to a transmitter-receiver combination 5A and 6A through high and low pass filters 45 and 46, is divided into two branches which are connected respectively to the low pass filter 43 and to the high pass filter 41 on the side thereof connected to branch 39.

From the foregoing description it will be clear that a power transmission conductor may be employed for the transmission of microwave energy according to the so-called "surface wave" manner of propagation. It is also clear that the microwave energy may be removed from the power conductor and isolated from the power energy for amplification and if desired may be separated for the purpose of dropping certain portions of the frequency band thereof and for the insertion of other frequencies.

It should be understood that although the system describes a frequency division scheme, it is equally applicable to other forms of multiplexing.

Referring to Figs. 2, 3 and 4 of the drawings, the manner of joining a microwave transmission line to and from a power conductor will be described. Fig. 2 shows the type of junction indicated at 15 in Fig. 1. The conductor 14 is curved into the power line conductor 2 in the direction of microwave transmission. The insulation may remain of constant thickness on the conductors transmitting the microwave energy but preferably is varied at the junction as indicated in Figs. 2, 3 and 4. The insulation on the side of the microwave conductor from which or to which the bare power line is joined is thinned down adjacent the bare conductor, as indicated at 47, and is correspondingly thickened on the opposite side of the line as indicated at 48. The reason for preferring this variation in the thickness of the insulation is to concentrate the field closer to the surface of the conductor on the side opposite the bare conductor. It is believed that less radiation of the high frequency energy occurs when the insulation is thus varied. If the insulation were to extend outwardly upon a portion of the bare conductor a greater amount of high frequency energy would be deviated from the desired path and lost by radiation. Furthermore, by curving the microwave transmission line into conductor 2 in the desired direction of transmission there is a minimum of disturbance to the microwave propagation.

In Figs. 3 and 4, the microwave transmission conductor 14A is shown to be leaving the bare power line conductor 2, as per junction 22 in Fig. 1. In these two figures, the variation of the insulation 47 and 48 for the purpose of minimizing radiation of the microwave energy is also indicated.

In Figs. 5 and 6, a microwave transmission line is divided in accordance with the division indicated at junction 11 in Fig. 1. This type of junction is referred to as a directional divider for the reason that the transmission of energy bears a directional characteristic. The conductor 12 is divided into two legs 9 and 10, the legs separating gradually as indicated. The insulation about the conductors at the junction is preferably increased adjacent the splitting of the conductor, as indicated at 49 and continues with added thickness, as indicated at 50, on the sides of the conductors away from the adjacent conductor surfaces. The insulation is thinned down to a film at the junction along the opposed surfaces of the conductor as indicated at 51. The directional characteristic of the line is that signal energy flowing along line 12 toward the junction will be transmitted over the two branch lines 9 and 10 and that a signal flowing toward the junction over line 9 will be transmitted over line 12 but not line 10. Similarly a signal flowing over line 10 toward the junction will flow over line 12 but not over line 9.

Referring to Fig. 7, one of the high pass filters such as indicated at 8, 31, 41, 42 and 45, Fig. 1, is disclosed. This filter comprises a section of a waveguide 52 enclosing a body of dielectric material 53 which extends out of the ends of the waveguide. While the waveguide may be of any desired cross-sectional shape, it is herein referred to by way of illustration as being round since the round or cylindical waveguide is believed to provide the simplest form for transition of wave propagation from the "surface wave" transmission to a waveguide mode such as the $TE_{11}$ or $TM_{01}$, for example. The extended ends of the dielectric body 53 are tapered down to the insulation of conductors 54, 54A which are embedded into the dielectric body a short distance within and coaxially of the waveguide. By terminating the conductors 54, 54A a short distance within the end of the waveguide, the microwave energy is transferred to the waveguide along which it is propagated in accordance with a waveguide mode depending, of course, upon the cross-sectional shape of the waveguide. Both ends of the filter may be identical. The taper 55 at the ends of the dielectric body reduces the electromagnetic field about the conductors 54, 54A to a diameter corresponding to the diameter or cross-sectional dimension of the waveguide depending upon the shape of waveguide employed. The waveguide section operates as a filter since the dimension of the waveguide will determine the cut-off frequency thereof. The lower cut-off of the filter thus corresponds to the lower cut-off of a dielectric filled waveguide which is determined from the dimensions and materials of the waveguide structure and the desired mode of propagation employed. At the output end of the filter the taper of the dielectric body reduces the dielectric down to the thickness of the insulation covering on the transmission line, thus permitting the electromagnetic field to resume an optimum diameter with respect to interference and transmission losses.

In Fig. 8 one of the low pass filters, such as indicated at 7, 32, 43 and 46, Fig. 1, is shown in more detail. This filter comprises a rod 56 which may correspond in size to the conductor wire or may be of a different size depending on the characteristic of the filter. On the rod 56 are periodically spaced conductor plates or discs 57. The upper cut-off of this filter is approximately given by the formula $$\frac{\lambda_c}{2} < d$$

where $d$ is the spacing between adjacent plates and $\lambda_c$ is the cut-off frequency wavelength. The rod and plates need not be insulated but it may be desired to do so since a coating of dielectric material on the rod and plates as shown reduces the extent of the external field. The end plates of the filter are gradually reduced in diameter to a size slightly larger than the rod in order to minimize abrupt changes in the path of the wave propagation and thereby avoid reflections and undesired attenuation. For a further understanding of filters of this character, reference may be had to our joint application, A. G. Clavier-D. Thomas, Serial No. 152,132, filed of even date herewith.

The microwave transmission lines are preferably coupled to transmitter and receiver apparatus by means of a coaxial or waveguide structure as indicated diagrammatically at 58. As indicated in Fig. 1, the conductor which may comprise the waveguide or the outer conductor of a coaxial line, is provided with a flared horn portion suitable for launching microwave energy onto the single wire conductor or for transferring the microwave energy from the single wire conductor to a waveguide or coaxial line as the case may be. This type of launching and receiving structure is also shown in more detail in the aforesaid copending application.

In Fig. 9 a high pass, power separating filter is illustrated such as may be used at 13, 20, 21, 33 and 34 in Fig. 1. The filter is similar to the high pass filter shown in Fig. 7 in that it comprises a section of waveguide 59 within which is disposed a body of dielectric material 60 which projects from the ends of the guide. Transmission conductors 61 and 62 are embedded in the body of dielectric material with the ends thereof terminating a short distance within the ends of the waveguide. The dimensions of the waveguide are chosen so that the waveguide will pass the complete band of microwave frequencies. At one end is disposed a high tension insulator 63 generally of conical shape with barrier flanges 64 extending circumferentially of the insulator. This insulator is secured to one end of the waveguide 59 by pins 65 which are threaded or otherwise secured to openings contained in the wall of the waveguide. The high tension insulator provides a barrier to the high voltage power energy and at the same time provides a minimum of attenuation to the flow of microwave energy. The dielectric body 60 is tapered more gradually adjacent the insulator 63 as indicated at 66. By suitably tapering this portion of the body 60 the effect of the insulator 63 upon the microwave energy is compensated.

In Fig. 10 is shown an alternative drop channel circuit which may be connected to the transmission line through power separators, such as indicated at 33 and 34 for drop channel 19 in Fig. 1. The conductor 35 is divided similarly as shown in Fig. 1 into two branches 67 and 68 while the conductor 38 is divided into conductors 69 and 70. The branches 67 and 69 are connected to a high pass filter 71 designed to pass all but the band of low frequencies to be dropped. Branch 68 is connected to a low pass filter 72 arranged to pass only the low frequency signals to be received at the drop channel receiver 73. Branch 70 is connected to a high pass filter 74 arranged to pass only those high frequency signals transmitted from the drop channel terminal transmitter 75. The drop channel sides of filters 72 and 74 are connected to a single "surface wave" conductor 76 which in turn is connected through a line divider 77, a high pass filter 78 to transmitter 75 and through low pass filter 79 to receiver 73. The filters 72, 74, 78 and 79 are preferably so chosen that the band of frequencies to be dropped are the lowest frequencies of the entire band being transmitted over line 2, Fig. 1, while the high frequencies transmitted from the drop channel terminal are the highest of the high frequency band transmitted. It will be clear, however, that the frequencies to be dropped and inserted may be any predetermined frequency bands within the entire transmission band, the separating filters being designed accordingly. It should also be noted that branches 68 and 70 are connected into the transmission system by directional dividers 80 and 81, the direction of drop channel propagation and channel inserter propagation being determined at least in part by the directional dividers.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a transmission system, a power line having conductors for the transmission of electric power, a microwave transmission line comprising a single insulated conductor capable of wave propagation according to a manner wherein the electromagnetic field for a given conductor size and a coating of given insulating quality is confined substantially within a given radius about the conductor, one of said power line conductors being coated with insulation for transmission according to said manner of wave propagation, the insulating coating on the combined power and microwave conductor portion of the power line being reduced in thickness on the side of the line from which the power line extends, and means connecting said microwave conductor to said one power line conductor for microwave transmission over the insulated portion thereof.

2. In a transmission system according to claim 1, wherein said means for connecting the microwave conductor to the power line conductor connects the microwave conductor at an acute angle to the power line conductor with the apex of the angle pointing in the direction of the insulated length of power line conductor over which microwave propagation is desired.

3. In a transmission system according to claim 1, further including a filter coupled in said microwave transmission line and adapted to pass the microwave energy only, comprising a wave guide section, and insulator means disposing the end of said conductor in microwave energy transfer relation with said guide.

4. In a transmission system according to claim 3, wherein said filter includes a high tension insulator of generally conical shape disposed about said conductor at the end of the dielectric wave guide where said conductor terminates.

5. A high pass filter according to claim 3 wherein said body of dielectric extends beyond the ends of said section with the ends of said dielectric tapered down to closely adjacent the surface of said conductors.

6. A high pass filter according to claim 5, wherein the waveguide section is extended beyond a portion of the tapered end of said body and a high tension insulator is connected thereto in spaced relation to the remainder of the tapered end portion of said body.

7. In a microwave transmission system having a conductor capable of wave propagation according to a mode wherein the electromagnetic field for a given conductor size and insulating coating of given quality and thickness is confined substantially within a given radius about said conductor, a division of said conductor into two legs which separate gradually, the insulation on said legs adjacent the junction thereof is of increased thickness on the outer surfaces of said legs and is of decreased thickness along the opposed surfaces of said legs.

References Cited in the file of this patent

UNITED STATES PATENTS

| | | |
|---|---|---|
| 2,097,300 | Muller | Nov. 26, 1937 |
| 2,207,845 | Wolff | July 16, 1940 |
| 2,279,697 | Terroni | Apr. 14, 1942 |
| 2,292,496 | Von Baeyer | Aug. 11, 1942 |
| 2,438,795 | Wheeler | Mar. 30, 1948 |
| 2,510,271 | Almquist | June 6, 1950 |
| 2,511,524 | Adler | June 13, 1950 |
| 2,575,571 | Wheeler | Nov. 20, 1951 |
| 2,617,880 | Iams | Nov. 11, 1952 |

FOREIGN PATENTS

| | | |
|---|---|---|
| 287,503 | Great Britain | Feb. 14, 1929 |

OTHER REFERENCES

"Radio Engineering," by F. E. Terman, third edition, 1947, McGraw-Hill Book Co., Inc., New York, page 115.